US011630693B2

(12) United States Patent
Browne et al.

(10) Patent No.: US 11,630,693 B2
(45) Date of Patent: Apr. 18, 2023

(54) TECHNOLOGIES FOR POWER-AWARE SCHEDULING FOR NETWORK PACKET PROCESSING

(71) Applicant: Intel Corporation, Santa Clara, CA (US)

(72) Inventors: John Browne, Limerick (IE); Chris MacNamara, Limerick (IE); Tomasz Kantecki, Ennis (IE); Peter McCarthy, Ennis (IE); Liang Ma, Shannon (IE); Mairtin O'Loingsigh, Shannon (IE); Rory Sexton, Fermoy Cork (IE); John Griffin, Charleville (IE); Nemanja Marjanovic, Galway (IE); David Hunt, Meelick (IE)

(73) Assignee: Intel Corporation, Santa Clara, CA (US)

( * ) Notice: Subject to any disclaimer, the term of this patent is extended or adjusted under 35 U.S.C. 154(b) by 1071 days.

(21) Appl. No.: 15/951,650

(22) Filed: Apr. 12, 2018

(65) Prior Publication Data
US 2019/0042310 A1 Feb. 7, 2019

(51) Int. Cl.
*G06F 9/46* (2006.01)
*G06F 9/48* (2006.01)
(Continued)

(52) U.S. Cl.
CPC .......... *G06F 9/4893* (2013.01); *G06F 1/3209* (2013.01); *G06F 1/329* (2013.01);
(Continued)

(58) Field of Classification Search
None
See application file for complete search history.

(56) References Cited

U.S. PATENT DOCUMENTS 7,283,538 B2 * 10/2007 Pham .................... H04L 49/50
370/396
7,788,670 B2 * 8/2010 Bodas ................... G06F 9/5044
718/100
(Continued)

OTHER PUBLICATIONS

IETF; RFC6101; datatracker.ietf.org/doc/html/rfc6101; 2011 (Year: 2011).*

(Continued)

*Primary Examiner* — Bing Zhao
(74) *Attorney, Agent, or Firm* — Compass IP Law PC

(57) ABSTRACT

Technologies for power-aware scheduling include a computing device that receives network packets. The computing device classifies the network packets by priority level and then assigns each network packet to a performance group bin. The packets are assigned based on priority level and other performance criteria. The computing device schedules the network packets assigned to each performance group for processing by a processing engine such as a processor core. Network packets assigned to performance groups having a high priority level are scheduled for processing by processing engines with a high performance level. The computing device may select performance levels for processing engines based on processing workload of the network packets. The computing device may control the performance level of the processing engines, for example by controlling the frequency of processor cores. The processing workload may include packet encryption. Other embodiments are described and claimed.

25 Claims, 4 Drawing Sheets

(51) Int. Cl.
*H04L 47/24* (2022.01)
*G06F 1/329* (2019.01)
*H04L 9/40* (2022.01)
*H04L 47/6275* (2022.01)
*G06F 1/3209* (2019.01)
*G06F 1/3296* (2019.01)
*G06F 1/3234* (2019.01)
*H04L 47/625* (2022.01)
*G06F 9/50* (2006.01)
*G06F 21/60* (2013.01)

(52) U.S. Cl.
CPC .......... *G06F 1/3278* (2013.01); *G06F 1/3296* (2013.01); *G06F 9/5044* (2013.01); *H04L 47/24* (2013.01); *H04L 47/625* (2013.01); *H04L 47/6275* (2013.01); *H04L 63/00* (2013.01); *H04L 63/0485* (2013.01); *G06F 21/602* (2013.01)

(56) References Cited

U.S. PATENT DOCUMENTS

| | | | |
|---|---|---|---|
| 8,018,961 B2* | 9/2011 | Gopinath | H04L 49/901 370/413 |
| 2014/0196050 A1* | 7/2014 | Yu | G06F 9/5088 718/104 |
| 2017/0318082 A1* | 11/2017 | Thakur | G06F 9/5027 |

OTHER PUBLICATIONS

IETF; RFC5246; datatracker.ietf.org/doc/html/rfc5246; 2008 (Year: 2008).*
Lanner, "What is Cryptographic Acceleration and How it Enhances Hardware Performance", Online: www.lanner-america.com/blog/cryptographic-acceleration-enhances-hardware-performance/, Lanner Electronics Canada Ltd. 2022, 11 pages.
Microsoft, "Receive Side Scaling (RSS)", Online: docs.microsoft.com/en-us/previous-versions/windows/it-pro/windows-server-2012-r2-and-2012/hh997036(v=ws.11), Aug. 2016, 3 pages.
V. Gopal et al., "Processing Multiple Buffers in Parallel to Increase Performance on Intel Architecture Processors", Intel Embedded White Paper, Jul. 2010, 24 pages.

* cited by examiner

TECHNOLOGIES FOR POWER-AWARE SCHEDULING FOR NETWORK PACKET PROCESSING

BACKGROUND

Typical data centers may handle many types of network traffic with different priorities. For example, real-time communications such as voice over IP or video data may have a different priority from file downloads. As another example, typical 4G wireless networks may include more than nine different traffic types. In current systems, I/O devices such as network controllers may differentiate traffic types using mechanisms such as IP type of service (TOS), differentiated services (DiffServ), Ethernet class of service priority bits (p-bits), or multiprotocol label switching (MPLS) labels. Processing of the network traffic on device is typically scheduled using a scheduling algorithm such as strict priority or weighted round robin.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
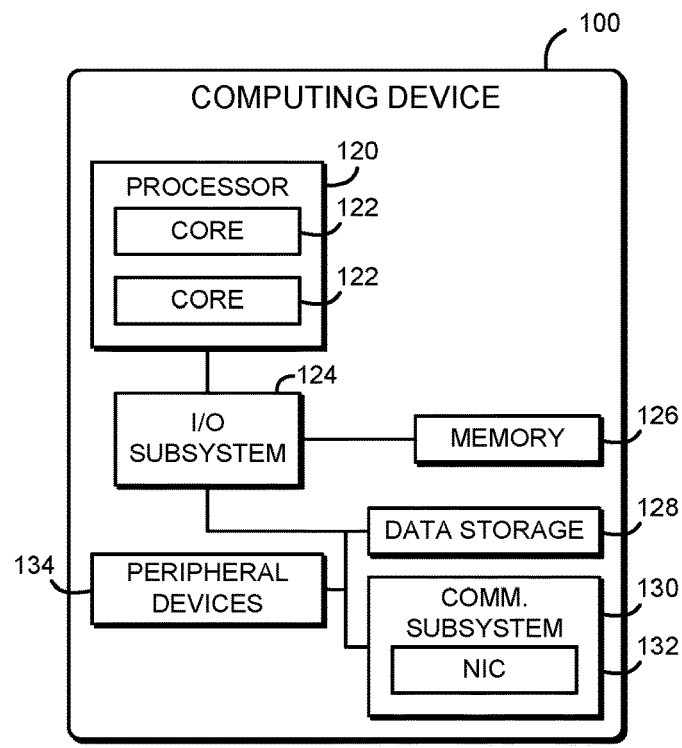
FIG. 1 is a simplified block diagram of at least one embodiment of a computing device for power-aware scheduling for network packet processing.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a computing device 100 performs power-aware scheduling for processing network packets. In use, as described further below, the computing device 100 classifies incoming network traffic based on priority. The computing device 100 further classifies the network packets into performance groups (bins) based on performance criteria such as priority and processor workload. The computing device 100 selects performance scaling for one or more processing engines (such as processor cores) to achieve the highest throughput and lowest latency for the grouped packets. The computing device 100 then schedules the network packets to the processing engines for processing. For example, high-priority network traffic may be scheduled to high-performance processing engines. The processing engines perform the workload, which may include any packet processing task, such as packet encryption or decryption, packet compression for network storage operations, or other operations. Thus, the computing device 100 may establish a prioritized path through the processor for differentiated services, and may guarantee that high-priority network traffic is processed with the fastest path and lowest latency available. The computing device 100 thus performs power-aware scheduling, including path selection within a group of processor cores and assignment of the resources on that path based on power. Accordingly, the computing device 100 may improve throughput and latency as compared to typical systems that do not use power-aware scheduling. The computing device 100 may particularly improve performance for operations that are processor-bound or otherwise dependent upon processor performance, such as packet encryption or compression operations. For example, a test computing device 100 may include certain processor cores that can perform better than others, for example some cores with Turbo Boost technology, which can deliver higher performance with higher frequency cores. The technologies described herein may deliver network traffic to the best available power resources, delivering performance improvement. For example, in one test a computing device 100 was able to achieve an improvement of about 50% in throughput and 20% in latency for encryption operations executed in software on a processor core.

The computing device 100 may be embodied as any type of computation or computer device capable of performing the functions described herein, including, without limitation, a computer, a server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. As shown in FIG. 1, the computing device 100 illustratively include a processor 120, an input/output subsystem 124, a memory 126, a data storage device 128, and a communication subsystem 130, and/or other components and devices commonly found in a server or similar computing device. Of course, the computing device 100 may include other or additional components, such as those commonly found in a managed switch (e.g., various input/output devices), in other embodiments. Additionally, in some embodiments, one or more of the illustrative components may be incorporated in, or otherwise form a portion of, another component. For example, the memory 126, or portions thereof, may be incorporated in the processor 120 in some embodiments.

The processor 120 may be embodied as any type of processor capable of performing the functions described herein. The processor 120 is illustratively a multi-core processor, however, in other embodiments the processor 120 may be embodied as a single or multi-core processor(s), digital signal processor, microcontroller, or other processor or processing/controlling circuit. As shown, the illustrative processor 120 includes two processor cores 122, each of which is an independent, general-purpose processing unit capable of executing programmed instructions. For example, each processor core 122 may execute instructions from a general-purpose instruction set architecture (ISA) such as IA-32 or Intel® 64. Although illustrated as including two processor cores 122, in some embodiments the processor 120 may include a larger number of processor cores 122, for example fourteen processor cores 122, twenty-eight processor cores 122, or a different number. In the illustrative embodiment, all of the processor cores 122 are identical; however, in some embodiments the processor cores 122 may be heterogeneous, including high-performance cores 122 and lower-performance cores 122. In some embodiments, the processor 120 may include one or more hardware accelerators for certain processing tasks (e.g., cryptographic accelerators, compression accelerators, or other accelerators). The accelerators may be embodied as field programmable gate arrays (FPGAs), application-specific integrated circuits (ASICs), or other logic blocks, and may be included in the processor cores 120 or outside of the processor cores 120 (i.e., in the uncore of the processor 120). Additionally, although illustrated as including a single processor 120, in some embodiments the computing device 100 may be embodied as a multi-socket server with multiple processors 120.

The memory 126 may be embodied as any type of volatile or non-volatile memory or data storage capable of performing the functions described herein. In operation, the memory 126 may store various data and software used during operation of the computing device 100, such as operating systems, applications, programs, libraries, and drivers. The memory 126 is communicatively coupled to the processor 120 via the I/O subsystem 124, which may be embodied as circuitry and/or components to facilitate input/output operations with the processor 120, the memory 126, and other components of the computing device 100. For example, the I/O subsystem 124 may be embodied as, or otherwise include, memory controller hubs, input/output control hubs, platform controller hubs, integrated control circuitry, firmware devices, communication links (i.e., point-to-point links, bus links, wires, cables, light guides, printed circuit board traces, etc.) and/or other components and subsystems to facilitate the input/output operations. In some embodiments, the I/O subsystem 124 may form a portion of a system-on-a-chip (SoC) and be incorporated, along with the processor 120, the memory 126, and other components of the computing device 100, on a single integrated circuit chip.

The data storage device 128 may be embodied as any type of device or devices configured for short-term or long-term storage of data such as, for example, memory devices and circuits, memory cards, hard disk drives, solid-state drives, or other data storage devices. The communication subsystem 130 of the computing device 100 may be embodied as any communication circuit, device, or collection thereof, capable of enabling communications between the computing device 100 and other remote devices over a network. The communication subsystem 130 may be configured to use any one or more communication technology (e.g., wired or wireless communications) and associated protocols (e.g., Ethernet, InfiniBand®, Bluetooth®, Wi-Fi®, WiMAX, etc.) to effect such communication. The communication subsystem 130 illustratively includes a network interface controller (NIC) 130.

As shown, the computing device 100 may further include one or more peripheral devices 134. The peripheral devices 134 may include any number of additional input/output devices, interface devices, accelerator devices, and/or other peripheral devices. For example, in some embodiments, the peripheral devices 134 may include a display, touch screen, graphics circuitry, FPGAs, ASICs, coprocessors, keyboard, mouse, speaker system, microphone, network interface, and/or other input/output devices, interface devices, and/or peripheral devices.

Figure 2:
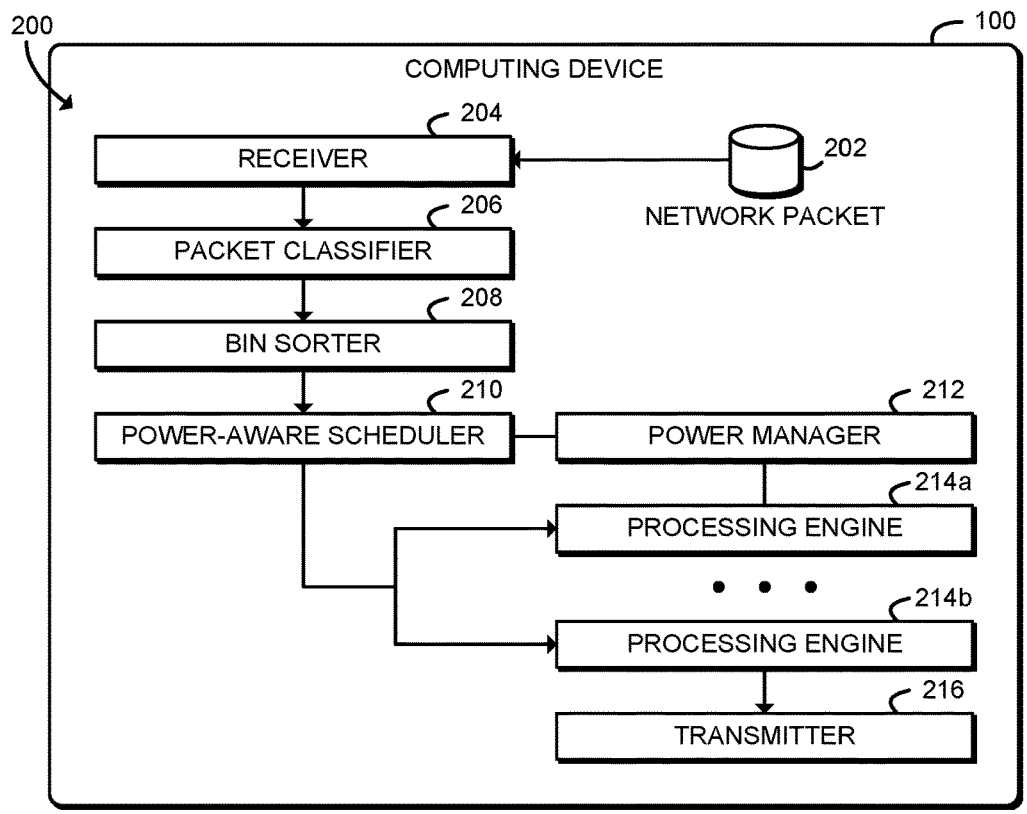
FIG. 2 is a simplified block diagram of at least one embodiment of an environment that may be established by the computing device of FIG. 1.

Referring now to FIG. 2, in an illustrative embodiment, the computing device 100 establishes an environment 200 during operation. The illustrative environment 200 includes a receiver 204, a packet classifier 206, a bin sorter 208, a power-aware scheduler 210, a power manager 212, multiple processing engines 214, and a transmitter 216. The various components of the environment 200 may be embodied as hardware, firmware, software, or a combination thereof. As such, in some embodiments, one or more of the components of the environment 200 may be embodied as circuitry or collection of electrical devices (e.g., receiver circuitry 204, packet classifier circuitry 206, bin sorter circuitry 208, power-aware scheduler circuitry 210, power manager circuitry 212, processing engine circuitry 214, and/or transmitter circuitry 216). It should be appreciated that, in such embodiments, one or more of the receiver circuitry 204, the packet classifier circuitry 206, the bin sorter circuitry 208, the power-aware scheduler circuitry 210, the power manager circuitry 212, the processing engine circuitry 214, and/or the transmitter circuitry 216 may form a portion of one or more of the processor 120, the I/O subsystem 124, the communication subsystem 130, and/or other components of the computing device 100. Additionally, in some embodiments, one or more of the illustrative components may form a portion of another component and/or one or more of the illustrative components may be independent of one another.

The receiver 204 is configured to receive network packets 202, for example received by the communication subsystem 128. The packet classifier 206 is configured to determine a priority level for each network packet 202. The priority level may include one or more high priority levels (e.g., guaranteed quality of service) and one or more lower priority levels (e.g., best-effort priority). The priority level for each network packet 202 may be determined based on a differentiated service label of the network packet 202, such as IP TOS, DiffServ, Ethernet p-bits, MPLS labels, headers identifying a service chain such as network services headers (NSH), or LTE traffic class.

The bin sorter 208 is configured to assign each network packet 202 to one of multiple performance groups based on one or more performance criteria of each network packet 202. The performance criteria include the priority level, and may include other criteria relating to processing intensity. For example, the performance criteria further may further include an encryption algorithm and a packet length of the network packet 202.

The power-aware scheduler 210 is configured to schedule the network packets 202 assigned to each performance group for processing by a processing engine 214 of the computing device 100. As described further below, each of the processing engines 214 has a performance level. The network packets 202 assigned to a performance group having a high priority level are scheduled for processing by a processing engine 214 with a high performance level.

The power-aware scheduler 210 may be further configured to determine a processing workload for each performance group. The processing workload may indicate the processing cost associated with the network packets 202 of the performance group. For example, the processing workload may be determined as a function of an encryption algorithm (e.g., processor cycles per byte for that algorithm) and a packet length. In some embodiments, the processing workload may also be determined as a function of a cost for offloading processing to a hardware accelerator (e.g., associated latency). The power-aware scheduler 210 may be further configured to determine the performance scaling level for each processing engine 214 based on the processing workload for each performance group. Determining the performance scaling level may include determining a frequency of each processing engine 214 or whether to activate the processing engine 214 (i.e., an activation state of each processing engine 214). In some embodiments, the performance scaling level may be determined by selecting a processing engine 214 having a predetermined performance level or may be determined dynamically based on processing workload.

The power manager 212 is configured to apply a selected performance scaling level to each processing engine 214. The power manager 212 may be embodied as, for example, a power control unit (PCU) included in the uncore of the processor 120, or as any other hardware, firmware, and/or software device that controls performance scaling of the processing engines 214.

Each processing engine 214 is configured to perform a processing workload for each of the network packets 202 in response to scheduling the network packets 202. The processing workload may include, for example an encryption operation or a compression operation. Each processing engine 214 may be embodied as, for example, a processor core 122 of the processor 120, a hardware accelerator, or other processing resource of the computing device 100. The transmitter 216 is configured to transmit the network packets 202 in response to performing the processing workload.

Figure 3:
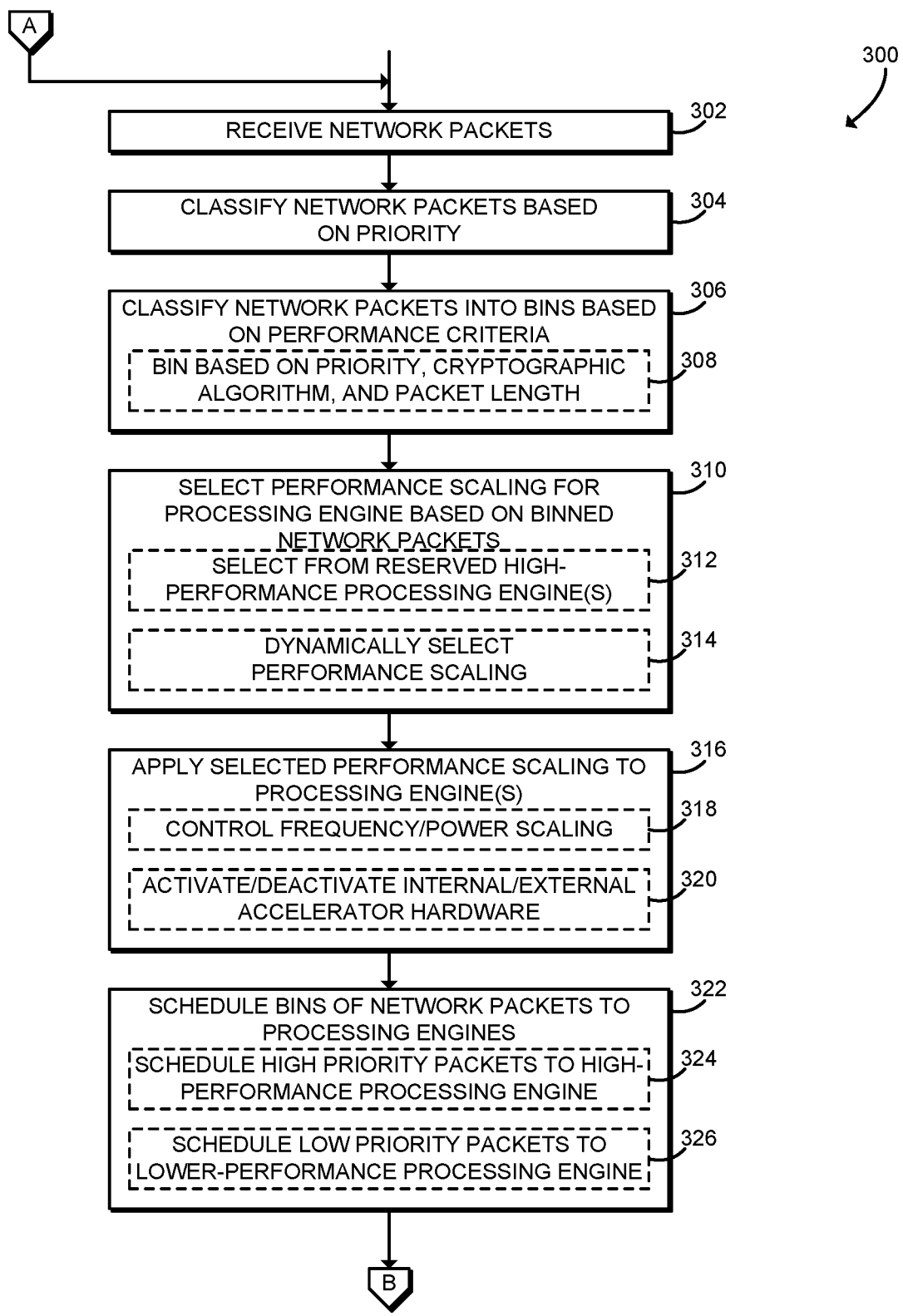
FIGS. 3 and 4 are a simplified flow diagram of at least one embodiment of a method for power-aware scheduling that may be performed by the computing device of FIGS. 1-2.
Figure 4:
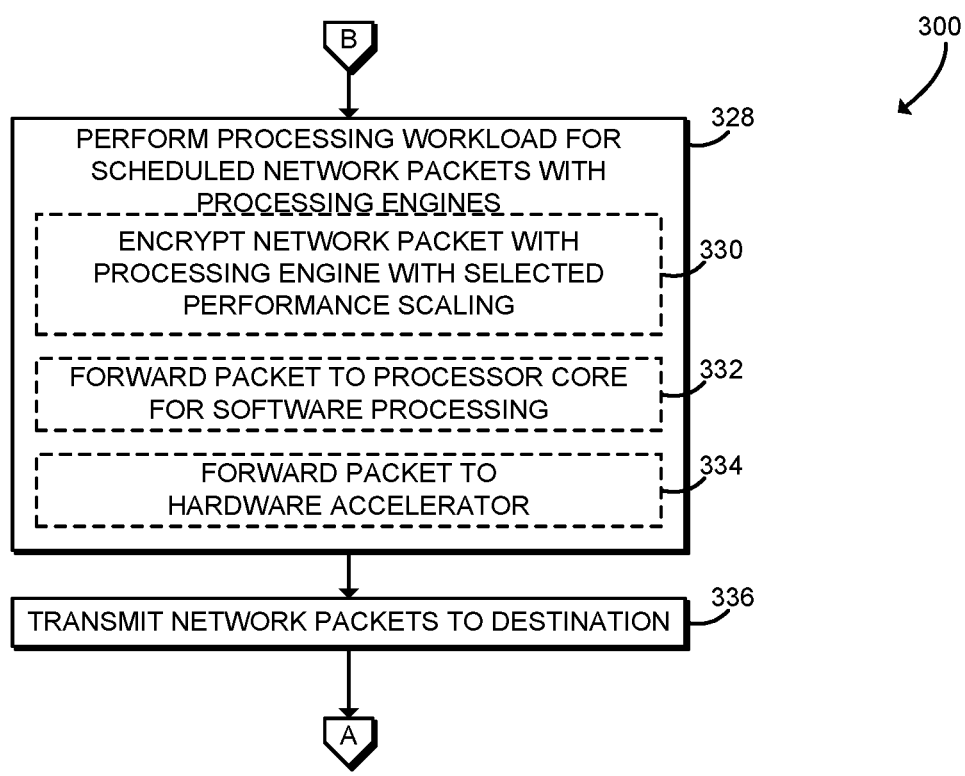

Referring now to FIGS. 3 and 4, in use, the computing device 100 may execute a method 300 for power-aware scheduling of network packet processing. It should be appreciated that, in some embodiments, the operations of the method 300 may be performed by one or more components of the environment 200 of the computing device 100 as shown in FIG. 2. The method 300 begins in block 302, in which the computing device 100 receives incoming network packets 202. The network packets 202 may be embodied as, for example, incoming Ethernet frames or other network data packets received by the communication subsystem 128 of the computing device 100. The network packets 202 may be received from an input source such as a NIC 130, a hardware accelerator for network data, or a hardware traffic distributor function.

In block 304, the computing device 100 classifies the network packets 202 based on priority. The computing device 100 may classify the network packets as high priority (e.g., guaranteed quality of service) or a lower priority (e.g., best-effort priority). The computing device 100 may classify the network packets 202 by parsing the packets 202 and reading certain fields, flags or other indications of priority. For example, the computing device 100 may evaluate one or more differentiated service labels included in the network packet 202, such as IP TOS, DiffServ, Ethernet p-bits, MPLS labels, NSH headers, or LTE traffic class.

In block 306, the computing device 100 classifies the network packets 202 into performance groups (bins) based on performance criteria. The performance criteria may include any characteristics of the network packets 202 that are indicative of the computational intensity or other cost associated with processing the network packets 202. The computing device 100 may sort the network packets 202 into bins of packets with similar performance criteria. In some embodiments, in block 308 the computing device 100 may bin the network packets 202 based on the priority level, a cryptographic algorithm to be performed, and a packet length. For example, short-length packets may be grouped with other short-length packets, which may be sorted into a different group from long-length packets. Packet length may indicate traffic type. For example, in that embodiment short packets may include higher-priority VoIP packets, while long packets may include lower-priority file download packets. In some embodiments, a range of packet lengths may be used for classifying packets into bins. The computing device 100 may implement a cache of already-binned packets 202 in order to avoid overhead associated with already-binned packets 202.

In block 310, the computing device 100 selects a performance scaling level for one or more processing engines 214 based on the binned network packets 202. The computing device 100 may select a performance scaling level based on the total processing workload for priority network packets 202 (e.g., network packets sorted into bins with high priority levels, number of bins, or other measure of workload). The processing workload may be determined based on the processor cycles or other processing time required for each network packet 202. For example, the processing workload may be determined as a function of the cryptographic algorithm to be performed on each network packet 202 (e.g., the processor cycles per byte to perform the cryptographic algorithm) and the packet length. The computing device 100 may select the performance scaling level that optimizes bandwidth and latency for the current volume of priority network packets 202.

In some embodiments, in block 312, the computing device 100 may select performance scaling from one or more reserved high-performance processing engines 214. For example, in some embodiments, one or more processor cores 122 may be reserved as high-performance cores 122. In those embodiments, the high-performance cores 122 may be configured with a higher operating frequency compared to other cores 122 of the processor 120. Additionally or alternatively, in some embodiments the processor 120 may include heterogeneous processor cores 122 with different performance characteristics, and one or more high-performance cores 122 may be reserved for high-priority network packets 202.

In some embodiments, in block 314, the computing device 100 may dynamically select performance scaling for one or more processing engines 114. The performance scaling may be scaled based on demand. The computing device 100 may use hysteresis with delay or other dampening to prevent bouncing from high to low frequency when traffic alternates quickly between higher and lower priority traffic. One potential embodiment of a method for on-demand performance scaling is described further below in connection with FIG. 5. In some embodiments, reserved and on-demand scaling may be combined. For example, higher-priority network packets 202 may be selected for pre-allocated high-performance processing engines 214, and lower priority network packets (e.g., best effort) may be selected for on-demand scaling.

In block 316, the computing device 100 applies the selected performance scaling to the processing engines 214. The computing device 100 may use any technique to adjust the performance of the processing engines 214. In some embodiments, in block 318 the computing device 100 may control the frequency or power scaling of one or more processor cores 122. For example, the computing device 100 may control the base frequency, boost frequency, frequency multiplier, or other frequency scaling factor of the processor core 122. The computing device 100 may also adjust other power/performance characteristics of the processor core 122, such as a vector instruction width (e.g., AVX width), sleep state, idle state (e.g., C-state), power state (e.g., P-state), or other power/performance characteristics. In some embodiments, in block 320, the computing device 100 may activate or deactivate one or more hardware accelerators. The hardware accelerators may be internal to the processor 120 or external (e.g., PCIe devices). For example, hardware accelerators may be activated when computational demand increases above a threshold.

In block 322, the computing device 100 schedules the bins of network packets 202 to the processing engines 214. In block 324, the computing device 100 schedules high-priority packets 202 to one or more high-performance processing engines 214. For example, the high-priority packets 202 may be scheduled to high-frequency processor cores 122 or to one or more hardware accelerators. In block 326, the computing device 100 may schedule lower priority packets 202 to one or more low-performance processing engines 214. The lower priority packets 202 may be scheduled using strict priority, weighted round robin, or other scheduling algorithms.

In block 328, shown in FIG. 4, the computing device 100 performs the processing workload for the scheduled network packets 202 with the processing engines 214. The computing device 100 may perform any packet processing workload, such as encryption, decryption, compression, decompression, or other operations. In some embodiments, in block 330 the computing device 100 may encrypt the network packet 202 using a processing engine 214 with the selected performance scaling. For example, high-priority packets 202 may be encrypted using high-frequency processor cores 122. In some embodiments, in block 332 the network packets 202 may be forwarded to a processor core 122 for software processing. The software processing may use one or more specialized instruction sets to accelerate processing. For example, in some embodiments, the processor core 122 may use one or more single-instruction multiple-data instructions, such as Intel AVX instructions. As another example, in some embodiments the processor core 122 may use specialized cryptographic instructions such as AES-NI. In some embodiments, in block 334 the network packets 202 may be forwarded to a hardware accelerator, such as a cryptographic accelerator.

In block 336, after processing, the network packets 202 are forwarded to their destination. For example, the network packets 202 may be forwarded to a destination NIC 130, a hardware accelerator for network, or a hardware traffic distributor function. After transmitting the network packets 202, the method 300 loops back to block 302, shown in FIG. 3, to continue processing incoming network packets 202.

Figure 5:
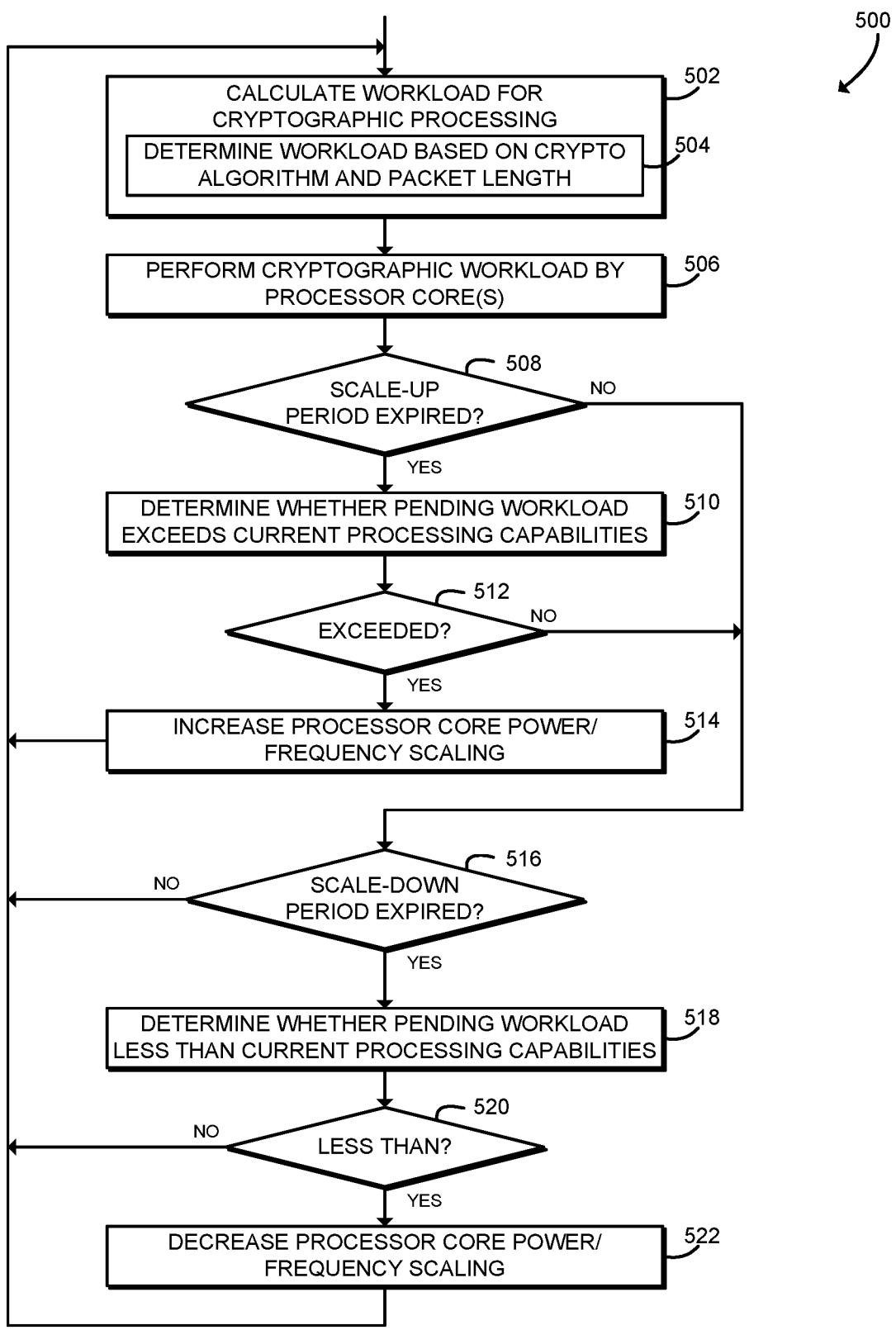
FIG. 5 is a simplified flow diagram of at least one embodiment of a method for dynamic power and performance management that may be performed by the computing device of FIGS. 1-2.

Referring now to FIG. 5, in use, the computing device 100 may execute a method 500 for dynamic power and performance management. It should be appreciated that, in some embodiments, the operations of the method 500 may be performed by one or more components of the environment 200 of the computing device 100 as shown in FIG. 2. The method 500 begins in block 502, in which the computing device 100 determines a workload for cryptographic processing of network packets 202. The network packets 202 may have been previously sorted into a performance group as described above in connection with block 306 of FIG. 3. In block 504, the computing device 100 determines a processor workload for the network packets 202 based on the cryptographic algorithm to be used and the packet length. The processor workload may, for example, be indicative of the number of processor cycles required to encrypt the network packets 202 with the selected cryptographic algorithm. In block 506, the computing device 100 performs the cryptographic workload on the network packets 202 by the selected processor cores 122.

In block 508, the computing device 100 determines whether a scale-up time period has expired. The scale-up time period may be a delay or other time period used to dampen frequency changes for the processor cores 122. The computing device 100 may determine whether the scale-up time period has expired in parallel with performing the cryptographic workloads or serially (for example, by interrupting the cryptographic workload). If the scale-up period has not expired, the method 500 jumps ahead to block 516, described below. If the scale-up period has expired, the method 500 advances to block 510.

In block 510, the computing device 100 determines whether the pending cryptographic workload exceeds current processing capabilities. For example, the computing device 100 may determine whether the current cryptographic workload may be completed by the processor core 122 at its current frequency within a predetermined time quantum. In block 512, the computing device 100 checks whether the current processing capabilities are exceeded. If not, the method 500 jumps ahead to block 516, described below. If the current processing capabilities are exceeded, the method 500 advances to block 514, in which the computing device 100 increases power or frequency scaling for one or more processor cores 122. After increasing the core frequency scaling, the method 500 loops back to block 502 to continue processing network packets 202.

Referring back to blocks 508, 512, if the scale-up period has not expired or the current processing capabilities are not exceeded, the method 500 branches to block 516, in which the computing device 100 determines whether a scale-down time period has expired. Similar to the scale-up time period, the scale-down time period may be a delay or other time period used to dampen frequency changes for the processor cores 122. The computing device 100 may determine whether the scale-down time period has expired in parallel with performing the cryptographic workloads or serially (for example, by interrupting the cryptographic workload). If the scale-down period has not expired, the method 500 loops back to block 502 to continue processing network packets 202. If the scale-down period has expired, the method 500 advances to block 518.

In block 518, the computing device 100 determines whether the pending cryptographic workload is less than the current processing capabilities. For example, the computing device 100 may determine whether the current cryptographic workload may be completed by the processor core 122 at its current frequency in less than the predetermined time quantum. In block 520, the computing device 100 checks whether the pending workload is less than the current processing capabilities. If not, the method 500 loops back to block 502 to continue processing network packets 202. If the current workload is less than the current processing capabilities, the method 500 advances to block 522, in which the computing device 100 decreases power or frequency scaling for one or more processor cores 122. Thus, the computing device 100 may reduce power consumption or otherwise optimize power and performance based on current network traffic conditions. After decreasing the core frequency scaling, the method 500 loops back to block 502 to continue processing network packets 202.

It should be appreciated that, in some embodiments, the methods 300 and/or 500 may be embodied as various instructions stored on a computer-readable media, which may be executed by the processor 120, the I/O subsystem 124, the communication subsystem 130, and/or other components of the computing device 100 to cause the computing device 100 to perform the respective method 300 and/or 500. The computer-readable media may be embodied as any type of media capable of being read by the computing device 100 including, but not limited to, the memory 126, the data storage device 128, firmware devices, and/or other media.

EXAMPLES

Illustrative examples of the technologies disclosed herein are provided below. An embodiment of the technologies may include any one or more, and any combination of, the examples described below.

Example 1 includes a computing device for network packet processing, the computing device comprising: a receiver to receive a plurality of network packets; a packet classifier to determine a priority level for each network packet of the plurality of network packets, wherein the priority level comprises a high priority level or a lower priority level; a bin sorter to assign each network packet of the plurality of network packets to a performance group of a plurality of performance groups based on one or more performance criteria of each network packet, wherein the one or more performance criteria include the priority level of the network packet; and a power-aware scheduler to schedule the network packets assigned to each performance group for processing by a processing engine of a plurality of processing engines of the computing device, wherein each of the processing engines has a performance level, and wherein network packets assigned to a performance group having the high priority level are scheduled for processing by a processing engine with a high performance level.

Example 2 includes the subject matter of Example 1, and wherein the one or more performance criteria further include an encryption algorithm and a packet length of the network packet.

Example 3 includes the subject matter of any of Examples 1 and 2, and wherein the computing device comprises a processor, and wherein each processing engine comprises a processor core of the processor.

Example 4 includes the subject matter of any of Examples 1-3, and wherein the processor cores comprise heterogeneous processor cores, and wherein the processing engine with a high performance level comprises a high performance processor core.

Example 5 includes the subject matter of any of Examples 1-4, and wherein the plurality of processing engines comprises one or more hardware accelerators.

Example 6 includes the subject matter of any of Examples 1-5, and wherein the power-aware scheduler is further to: determine a processing workload for each performance group of the plurality of performance groups in response to assigning each network packet to a performance group; and determine the performance scaling level for each processing engine of the plurality of processing engines based on the processing workload for each performance group; wherein to schedule the network packets comprises to schedule the network packets in response to a determination of the performance scaling level.

Example 7 includes the subject matter of any of Examples 1-6, and wherein to determine the processing workload comprises to determine the processing workload as a function of an encryption algorithm and a packet length.

Example 8 includes the subject matter of any of Examples 1-7, and wherein to determine the processing workload comprises to determine the processing workload as a function of processor cycles per byte for the encryption algorithm.

Example 9 includes the subject matter of any of Examples 1-8, and wherein to determine the performance scaling level for each processing engine comprises to determine a frequency of each processing engine.

Example 10 includes the subject matter of any of Examples 1-9, and wherein to determine the performance scaling level each processing engine comprises to determine an activation state of each processing engine.

Example 11 includes the subject matter of any of Examples 1-10, and wherein to determine the performance scaling level for each processing engine comprises to select a processing engine having a predetermined performance level.

Example 12 includes the subject matter of any of Examples 1-11, and wherein to determine the performance scaling level for each processing engine comprises to dynamically determine the performance scaling level for each processing engine based on the processing workload of the processing group associated with the corresponding processing engine.

Example 13 includes the subject matter of any of Examples 1-12, and wherein to dynamically determine the performance scaling level comprises to: determine whether the processing workload exceeds current processing capacity of the processing engine; increase the performance level in response to a determination that the processing workload exceeds the current processing capacity; and decrease the performance level in response to a determination that the processing workload does not exceed the current processing capacity.

Example 14 includes the subject matter of any of Examples 1-13, and further comprising a power manager to apply the performance scaling level to each processing engine of the plurality of processing engines in response to a determination of the performance scaling level; wherein to schedule the network packets comprises to schedule the network packets in response to application of the performance scaling level.

Example 15 includes the subject matter of any of Examples 1-14, and wherein the plurality of processing engines are to perform a processing workload for each of the plurality of network packets by the plurality of processing engines in response to scheduling of the network packets.

Example 16 includes the subject matter of any of Examples 1-15, and wherein to perform the processing workload comprises to perform an encryption operation for each of the plurality of network packets.

Example 17 includes the subject matter of any of Examples 1-16, and wherein to perform the processing workload comprises to perform a compression operation for each of the plurality of network packets.

Example 18 includes the subject matter of any of Examples 1-17, and further comprising a transmitter to transmit the plurality of network packets in response to performance of the processing workload.

Example 19 includes the subject matter of any of Examples 1-18, and wherein to determine the priority level for each network packet comprises to determine the priority level based on a differentiated service label of the network packet.

Example 20 includes a method for network packet processing, the method comprising: receiving, by a computing device, a plurality of network packets; determining, by the computing device, a priority level for each network packet of the plurality of network packets, wherein the priority level comprises a high priority level or a lower priority level; assigning, by the computing device, each network packet of the plurality of network packets to a performance group of a plurality of performance groups based on one or more performance criteria of each network packet, wherein the one or more performance criteria include the priority level of the network packet; and scheduling, by the computing device, the network packets assigned to each performance group for processing by a processing engine of a plurality of processing engines of the computing device, wherein each of the processing engines has a performance level, and wherein network packets assigned to a performance group having the high priority level are scheduled for processing by a processing engine with a high performance level.

Example 21 includes the subject matter of Example 20, and wherein the one or more performance criteria further include an encryption algorithm and a packet length of the network packet.

Example 22 includes the subject matter of any of Examples 20 and 21, and wherein each processing engine comprises a processor core of a processor of the computing device.

Example 23 includes the subject matter of any of Examples 20-22, and wherein the processor cores comprise heterogeneous processor cores, and wherein the processing engine with a high performance level comprises a high performance processor core.

Example 24 includes the subject matter of any of Examples 20-23, and wherein the plurality of processing engines comprises one or more hardware accelerators.

Example 25 includes the subject matter of any of Examples 20-24, and further comprising: determining, by the computing device, a processing workload for each performance group of the plurality of performance groups in response to assigning each network packet to a performance group; and determining, by the computing device, the performance scaling level for each processing engine of the plurality of processing engines based on the processing workload for each performance group; wherein scheduling the network packets comprises scheduling the network packets in response to determining the performance scaling level.

Example 26 includes the subject matter of any of Examples 20-25, and wherein determining the processing workload comprises determining the processing workload as a function of an encryption algorithm and a packet length.

Example 27 includes the subject matter of any of Examples 20-26, and wherein determining the processing workload comprises determining the processing workload as a function of processor cycles per byte for the encryption algorithm.

Example 28 includes the subject matter of any of Examples 20-27, and wherein determining the performance scaling level for each processing engine comprises determining a frequency of each processing engine.

Example 29 includes the subject matter of any of Examples 20-28, and wherein determining the performance scaling level each processing engine comprises determining an activation state of each processing engine.

Example 30 includes the subject matter of any of Examples 20-29, and wherein determining the performance scaling level for each processing engine comprises selecting a processing engine having a predetermined performance level.

Example 31 includes the subject matter of any of Examples 20-30, and wherein determining the performance scaling level for each processing engine comprises dynamically determining the performance scaling level for each processing engine based on the processing workload of the processing group associated with the corresponding processing engine.

Example 32 includes the subject matter of any of Examples 20-31, and wherein dynamically determining the performance scaling level comprises: determining whether the processing workload exceeds current processing capacity of the processing engine; increasing the performance level in response to determining that the processing workload exceeds the current processing capacity; and decreasing the performance level in response to determining that the processing workload does not exceed the current processing capacity.

Example 33 includes the subject matter of any of Examples 20-32, and further comprising: applying, by the computing device, the performance scaling level to each processing engine of the plurality of processing engines in response to determining the performance scaling level; wherein scheduling the network packets comprises scheduling the network packets in response to applying the performance scaling level.

Example 34 includes the subject matter of any of Examples 20-33, and further comprising performing, by the computing device, a processing workload for each of the plurality of network packets by the plurality of processing engines in response to scheduling the network packets.

Example 35 includes the subject matter of any of Examples 20-34, and wherein performing the processing workload comprises performing an encryption operation for each of the plurality of network packets.

Example 36 includes the subject matter of any of Examples 20-35, and wherein performing the processing workload comprises performing a compression operation for each of the plurality of network packets.

Example 37 includes the subject matter of any of Examples 20-36, and further comprising transmitting, by the computing device, the plurality of network packets in response to performing the processing workload.

Example 38 includes the subject matter of any of Examples 20-37, and wherein determining the priority level for each network packet comprises determining the priority level based on a differentiated service label of the network packet.

Example 39 includes one or more computer-readable storage media comprising a plurality of instructions stored thereon that, in response to being executed, cause a computing device to: receive a plurality of network packets; determine a priority level for each network packet of the plurality of network packets, wherein the priority level comprises a high priority level or a lower priority level; assign each network packet of the plurality of network packets to a performance group of a plurality of performance groups based on one or more performance criteria of each network packet, wherein the one or more performance criteria include the priority level of the network packet; and schedule the network packets assigned to each performance group for processing by a processing engine of a plurality of processing engines of the computing device, wherein each of the processing engines has a performance level, and wherein network packets assigned to a performance group having the high priority level are scheduled for processing by a processing engine with a high performance level.

Example 40 includes the subject matter of Example 39, and wherein the one or more performance criteria further include an encryption algorithm and a packet length of the network packet.

Example 41 includes the subject matter of any of Examples 39 and 40, and wherein each processing engine comprises a processor core of a processor of the computing device.

Example 42 includes the subject matter of any of Examples 39-41, and wherein the processor cores comprise heterogeneous processor cores, and wherein the processing engine with a high performance level comprises a high performance processor core.

Example 43 includes the subject matter of any of Examples 39-42, and wherein the plurality of processing engines comprises one or more hardware accelerators.

Example 44 includes the subject matter of any of Examples 39-43, and further comprising a plurality of instructions stored thereon that, in response to being executed, cause the computing device to: determine a processing workload for each performance group of the plurality of performance groups in response to assigning each network packet to a performance group; and determine the performance scaling level for each processing engine of the plurality of processing engines based on the processing workload for each performance group; wherein to schedule the network packets comprises to schedule the network packets in response to determining the performance scaling level.

Example 45 includes the subject matter of any of Examples 39-44, and wherein to determine the processing workload comprises to determine the processing workload as a function of an encryption algorithm and a packet length.

Example 46 includes the subject matter of any of Examples 39-45, and wherein to determine the processing workload comprises to determine the processing workload as a function of processor cycles per byte for the encryption algorithm.

Example 47 includes the subject matter of any of Examples 39-46, and wherein to determine the performance scaling level for each processing engine comprises to determine a frequency of each processing engine.

Example 48 includes the subject matter of any of Examples 39-47, and wherein to determine the performance scaling level each processing engine comprises to determine an activation state of each processing engine.

Example 49 includes the subject matter of any of Examples 39-48, and wherein to determine the performance scaling level for each processing engine comprises to select a processing engine having a predetermined performance level.

Example 50 includes the subject matter of any of Examples 39-49, and wherein to determine the performance scaling level for each processing engine comprises to dynamically determine the performance scaling level for each processing engine based on the processing workload of the processing group associated with the corresponding processing engine.

Example 51 includes the subject matter of any of Examples 39-50, and wherein to dynamically determine the performance scaling level comprises to: determine whether the processing workload exceeds current processing capacity of the processing engine; increase the performance level in response to determining that the processing workload exceeds the current processing capacity; and decrease the performance level in response to determining that the processing workload does not exceed the current processing capacity.

Example 52 includes the subject matter of any of Examples 39-51, and further comprising a plurality of instructions stored thereon that, in response to being executed, cause the computing device to: apply the performance scaling level to each processing engine of the plurality of processing engines in response to determining the performance scaling level; wherein to schedule the network packets comprises to schedule the network packets in response to applying the performance scaling level.

Example 53 includes the subject matter of any of Examples 39-52, and further comprising a plurality of instructions stored thereon that, in response to being executed, cause the computing device to perform a processing workload for each of the plurality of network packets by the plurality of processing engines in response to scheduling the network packets.

Example 54 includes the subject matter of any of Examples 39-53, and wherein to perform the processing workload comprises to perform an encryption operation for each of the plurality of network packets.

Example 55 includes the subject matter of any of Examples 39-54, and wherein to perform the processing workload comprises to perform a compression operation for each of the plurality of network packets.

Example 56 includes the subject matter of any of Examples 39-55, and further comprising a plurality of instructions stored thereon that, in response to being executed, cause the computing device to transmit the plurality of network packets in response to performing the processing workload.

Example 57 includes the subject matter of any of Examples 39-56, and wherein to determine the priority level for each network packet comprises to determine the priority level based on a differentiated service label of the network packet.

The invention claimed is:

1. A computing device for network packet processing, the computing device comprising:
   circuitry to receive a plurality of network packets;
   circuitry to determine a priority level for at least one network packet of the plurality of network packets, wherein the priority level comprises a first priority level or a second priority level;
   circuitry to assign the at least one network packet of the plurality of network packets to a performance group of a plurality of performance groups based on one or more performance criteria of the at least one network packet, wherein the one or more performance criteria include the priority level of the network packet and a packet length range;
   circuitry to determine a frequency of operation of at least one processing engine, selected from a plurality of processing engines, and to adjust the frequency of operation of the at least one processing engine based on the priority level of the at least one network packet and packet length range associated with the assigned performance group; and
   circuitry to schedule the at least one network packet assigned to the performance group for processing by the at least one processing engine with adjusted frequency of operation.

2. The computing device of claim 1, wherein the one or more performance criteria further include a cryptographic operation.

3. The computing device of claim 1, wherein the computing device comprises a processor, and wherein the at least one processing engine comprises a processor core of the processor.

4. The computing device of claim 3, wherein the processor core comprise heterogeneous processor cores, and wherein the processing engine with a first performance level comprises a processor core.

5. The computing device of claim 1, wherein the plurality of processing engines comprises one or more hardware accelerators.

6. The computing device of claim 1, wherein the circuitry to schedule is further to:
   determine a processing workload for at least one performance group of the plurality of performance groups in response to assigning at least one network packet to a performance group; and
   determine at least one performance scaling level for at least one processing engine of the plurality of processing engines based on the processing workload for at least one performance group;
   wherein to schedule the network packets comprises to schedule the network packets in response to a determination of the at least one performance scaling level and
   wherein the performance scaling level is associated with a frequency of operation and/or supplied power level.

7. The computing device of claim 6, wherein to determine the processing workload comprises to determine the processing workload based on an applied encryption algorithm and a packet length range.

8. The computing device of claim 6, wherein to determine the at least one performance scaling level for at least one processing engine comprises to determine a frequency of operation of at least one processing engine.

9. The computing device of claim 6, wherein to determine the at least one performance scaling level for at least one processing engine comprises to dynamically determine the at least one performance scaling level for at least one processing engine based on the processing workload of a processing group associated with a corresponding processing engine.

10. The computing device of claim 6, further comprising a power manager to apply the at least one performance scaling level to at least one processing engine of the plurality of processing engines in response to a determination of the at least one performance scaling level;
   wherein to schedule the network packets comprises to schedule the network packets in response to application of the at least one performance scaling level.

11. The computing device of claim 1, wherein the plurality of processing engines are to perform a processing workload for at least one of the plurality of network packets by the plurality of processing engines in response to scheduling of the network packets.

12. The computing device of claim 11, wherein to perform the processing workload comprises to perform an encryption operation for at least one of the plurality of network packets.

13. The computing device of claim 11, wherein to perform the processing workload comprises to perform a compression operation for at least one of the plurality of network packets.

14. The computing device of claim 11, further comprising a transmitter to transmit the plurality of network packets in response to performance of the processing workload.

15. A method for network packet processing, the method comprising:
   receiving, by a computing device, a plurality of network packets;
   determining, by the computing device, a priority level for at least one network packet of the plurality of network packets, wherein the priority level comprises a first priority level or a second priority level;
   assigning, by the computing device, the at least one network packet of the plurality of network packets to a performance group of a plurality of performance groups based on one or more performance criteria of the at least one network packet, wherein the one or more performance criteria include the priority level of the network packet and a packet length range;
   determining, by the computing device, a frequency of operation of at least one processing engine, selected from a plurality of processing engines, and to adjust the frequency of operation of the at least one processing engine based on the priority level of the at least one network packet and packet length range associated with the assigned performance group; and
   scheduling, by the computing device, the at least one network packet assigned to the performance group for processing by the at least one processing engine with adjusted frequency of operation.

16. The method of claim 15, wherein the one or more performance criteria further include a cryptographic operation.

17. The method of claim 15, wherein at least one processing engine comprises a processor core of a processor of the computing device.

18. The method of claim 15, further comprising:
   determining, by the computing device, a processing workload for at least one performance group of the plurality of performance groups in response to assigning at least one network packet to a performance group; and determining, by the computing device, at least one performance scaling level for at least one processing engine of the plurality of processing engines based on the processing workload for at least one performance group;

wherein scheduling the network packets comprises scheduling the network packets in response to determining the at least one performance scaling level.

19. The method of claim 18, wherein determining the at least one performance scaling level for at least one processing engine comprises determining a frequency of operation of at least one processing engine.

20. One or more non-transitory computer-readable storage media comprising a plurality of instructions stored thereon that, in response to being executed, cause a computing device to:

receive a plurality of network packets;

determine a priority level for at least one network packet of the plurality of network packets, wherein the priority level comprises a first priority level or a second priority level;

assign the at least one network packet of the plurality of network packets to a performance group of a plurality of performance groups based on one or more performance criteria of the at least one network packet, wherein the one or more performance criteria include the priority level of the network packet and a packet length range;

determine a frequency of operation of at least one processing engine, selected from a plurality of processing engines, and to adjust the frequency of operation of the at least one processing engine based on the priority level of the at least one network packet and packet length range associated with the assigned performance group; and schedule the at least one network packet assigned to the performance group for processing by the at least one processing engine with adjusted frequency of operation.

21. The one or more computer-readable storage media of claim 20, wherein the one or more performance criteria further include a cryptographic operation.

22. The one or more computer-readable storage media of claim 20, wherein at least one processing engine comprises a processor core of a processor of the computing device.

23. The one or more computer-readable storage media of claim 20, further comprising a plurality of instructions stored thereon that, in response to being executed, cause the computing device to:

determine a processing workload for at least one performance group of the plurality of performance groups in response to assigning at least one network packet to a performance group; and determine at least one performance scaling level for at least one processing engine of the plurality of processing engines based on the processing workload for at least one performance group;

wherein to schedule the network packets comprises to schedule the network packets in response to determining the at least one performance scaling level.

24. The one or more computer-readable storage media of claim 23, wherein to determine the at least one performance scaling level for at least one processing engine comprises to determine a frequency of operation of at least one processing engine.

25. The one or more computer-readable storage media of claim 20, further comprising a plurality of instructions stored thereon that, in response to being executed, cause the computing device to perform a processing workload for at least one of the plurality of network packets by the plurality of processing engines in response to scheduling the network packets.

* * * * *